US008844895B2

(12) United States Patent
Palma et al.

(10) Patent No.: US 8,844,895 B2
(45) Date of Patent: Sep. 30, 2014

(54) HOLD OPEN ROD VIBRATION DAMPENING SYSTEM AND METHOD

(75) Inventors: Julio Palma, Waco, TX (US); Ryan A. Wheeler, Waco, TX (US)

(73) Assignee: MarathonNorco Aerospace, Inc., Waco, TX (US)

( * ) Notice: Subject to any disclaimer, the term of this patent is extended or adjusted under 35 U.S.C. 154(b) by 91 days.

(21) Appl. No.: 13/397,320

(22) Filed: Feb. 15, 2012

(65) Prior Publication Data

US 2013/0206955 A1 Aug. 15, 2013

(51) Int. Cl.
*F16M 13/00* (2006.01)

(52) U.S. Cl.
USPC ............ 248/602; 248/200.1; 16/49; 188/280; 267/64.12; 267/120

(58) Field of Classification Search
CPC .......... B23P 11/00; E05F 5/02; F16B 7/1409; F16F 7/09; E05C 17/30
USPC .............. 248/602, 351, 352, 354.1, 357, 562, 248/631, 200.1; 16/49, 82; 188/67, 129, 188/381, 280; 74/531; 292/338; 267/120, 267/64.12
See application file for complete search history.

(56) References Cited

U.S. PATENT DOCUMENTS

| | | | | |
|---|---|---|---|---|
| 2,953,811 | A * | 9/1960 | Hall | 16/66 |
| 2,996,754 | A * | 8/1961 | Ziegler et al. | 16/52 |
| 3,938,793 | A * | 2/1976 | Kaptanis et al. | 267/120 |
| 3,963,227 | A * | 6/1976 | Molders | 267/120 |
| 4,230,309 | A * | 10/1980 | Schnitzius | 267/120 |
| 5,220,706 | A * | 6/1993 | Bivens | 16/66 |
| 5,702,091 | A * | 12/1997 | Perrin et al. | 267/64.12 |
| 7,281,704 | B2 * | 10/2007 | Salice | 267/124 |

* cited by examiner

*Primary Examiner* — Anita M King
(74) *Attorney, Agent, or Firm* — Baker & Hostetler LLP

(57) ABSTRACT

A hold open rod is provided. The hold open rod may include: an outer tube; an inner tube having two ends, at least one end configured to slide within the outer tube; a tube stop located at one end of the inner tube; a groove around the circumference of the tube stop; and a resilient material located in the groove, the resilient material contacting the tube stop and the outer tube. A method of reducing wear on a hold open rod may be provided. The method may include: locating first resilient material between an inner tube and an outer tube; providing a locking mechanism to lock the inner tube with respect to the outer tube; and providing a second resilient material between an isolator and a collar on the locking mechanism.

14 Claims, 3 Drawing Sheets

HOLD OPEN ROD VIBRATION DAMPENING SYSTEM AND METHOD

FIELD OF THE INVENTION

The present invention relates generally to hold open rods. More particularly, the present invention relates to an apparatus and method for locking a hold open apparatus.

BACKGROUND OF THE INVENTION

Hold open rods are well known in the both the automotive industry and the aviation industry. Hold open rods hold open a door or hatch after the door or hatch has been opened manually or automatically. Hold open rods may support a considerable amount of weight. It is desired that the rods function correctly and do not malfunction in supporting this weight.

Generally, the rods include two cylindrical, telescoping tubes, a first tube disposed inside a second tube, this constitutes an inner and outer tube, respectively. When in the resting or "stowed" position, the inner tube is generally located almost entirely within the outer tube. The inner tube can be extended to a designated position to hold open the door. At this extended position, the tubes are locked in place, in order to open the door. Such locking prevents the inner tube from retracting into the outer tube and also permits the tubes to support the weight of the door. The locking mechanism can be released by an operator.

In aerospace applications hold open rods are often subject into intense vibration during flight. Due to the interaction between the inner tube and the outer tube, unwanted noise and fretting occurs between contacting parts. This fretting can cause premature wear to the hold open assembly. Further, the fretting may potentially damage or eliminate the corrosion protection coating applied to components of the hold open rod and thereby potentially compromise the ability of the hold open rod to be resistant to corrosion. Removing corrosion resistant coatings may potentially impair the functionality of the hold open rod.

Thus it would be desirable for a method or system that can dampen or eliminate noise and fretting between hold open rod components. Particularly, dampening is desired in hold open rods used in the aviation industry. In the aviation industry, a door or hatch is likely to be maintained in the closed position where vibration may be experienced between the various components of the hold open rod, and where significant fretting has long been known to occur. Further, it may be desirable for the dampening system to reduce noise and/or wear due to vibration of the hold open rod.

SUMMARY OF THE INVENTION

The foregoing needs are met, to a great extent, by the present invention. In one aspect, a system or method is provided that may dampen and/or eliminate noise and fretting between hold open rod components. In particular, the system may be effective when a hold open rod is in a closed position where the vibration most often is experienced and where significant fretting between components has long been known to occur.

In accordance with one embodiment of the present invention, a hold open rod is provided. The hold open rod may include: an outer tube; an inner tube having two ends, at least one end configured to slide within the outer tube; a tube stop located at one end of the inner tube; a groove around the circumference of the tube stop; and a resilient material located in the groove, with the resilient material configured to contact the tube stop and the outer tube.

In accordance with another embodiment of the present invention, a hold open rod may be provided. The hold open rod may include: an outer tube; an inner tube having two ends, at least one end configured to slide within the outer tube; means for locking configured to be actuated to selectively release and lock the inner tube with the outer tube; an isolator contained by the releasing means surrounding the outer tube; and means for reducing wear surrounding and contacting the isolator and the releasing means.

In accordance with yet another embodiment of the present invention, a method of reducing wear on a hold open rod may be provided. The method may include: locating first resilient material between an inner tube and an outer tube; providing a locking mechanism to lock the inner tube with respect to the outer tube; and providing a second resilient material between an isolator and a collar on the locking mechanism.

There have thus been outlined, rather broadly, certain embodiments of the invention in order that the detailed description thereof herein may be better understood, and in order that the present contribution to the art may be better appreciated. There are, of course, additional embodiments of the invention that will be described below, and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
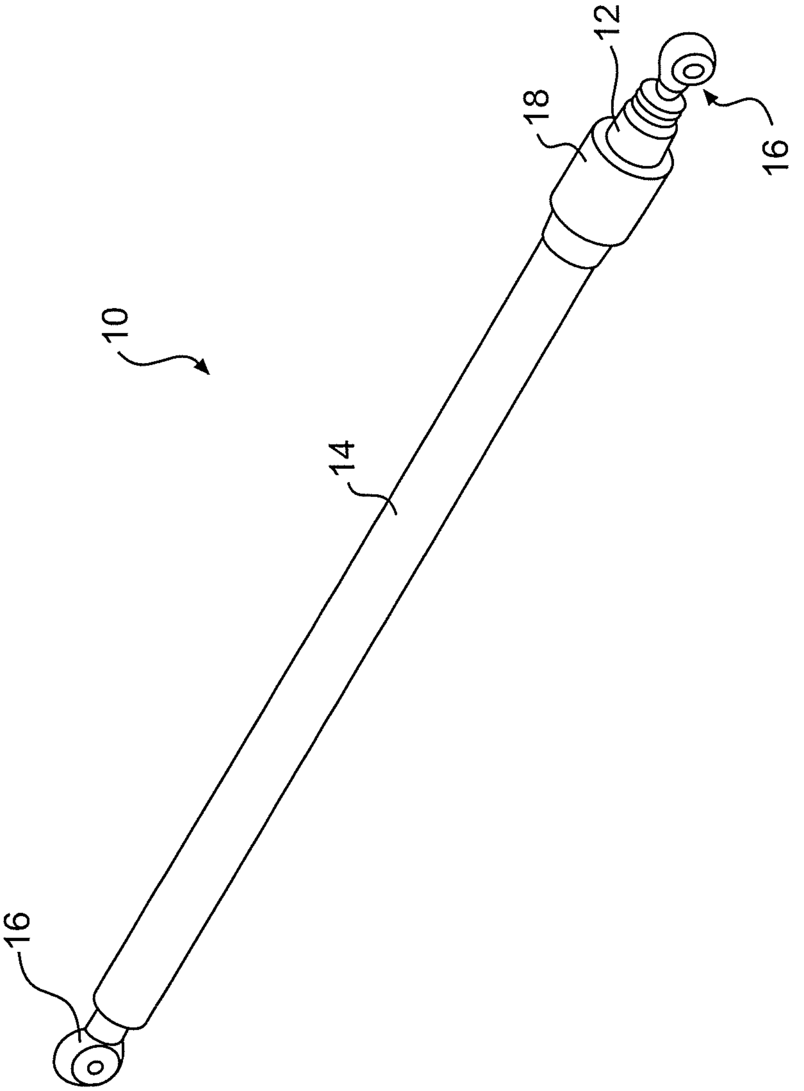
FIG. 1 is a perspective view of a hold open rod in accordance with an embodiment of the invention.

The invention will now be described with reference to the drawing figures, in which like reference numerals refer to like parts throughout. An embodiment in accordance with the present invention provides a method and apparatus for dampening the vibration within a hold open rod. The dampening may reduce fretting, wear, and/or noise within the hold open rod as it is subjected to vibration incidental to travel such as air travel.

FIG. 1 illustrates a hold open rod 10 in accordance of an embodiment of the invention. The hold open rod 10 includes an inner tube 12 that slides within an outer tube 14. The position of the hold open rod 10 shown in FIG. 1 is the stowed, also referred to as the rest, or retracted position. In this position, the inner tube 12 is substantially inside the outer tube 14.

The hold open rod 10 may be extended by sliding the inner tube 12 far enough out from the outer tube 14 to reach a desired length. The hold open rod 10 includes fasteners 16 to connect the hold open rod 10 to an object to which it will be mounted. For example, fasteners 16 may attach to a door or hatch on one side and on the other side to a frame of the door or hatch, thereby allowing the hold open rod 10 to hold the door or hatch in an open position. The hold open rod 10 can be allowed to selectively lock the inner tube 12 to the outer tube 14 in order to, for example, hold a door or hatch in an open position. The locking of the hold open rod 10 may be accomplished by manipulation of a collar 18.

When a hold open rod 10 is in a stowed position, as shown in FIG. 1, the door or hatch may likewise be in a closed position. Often, the stowed position is the position in which the hold open rod 10 spends a majority of its time. Vibration incidental with air travel can cause the hold open rod 10, while in a stowed position, to wear, fret, rattle and make noise.

Figure 2:
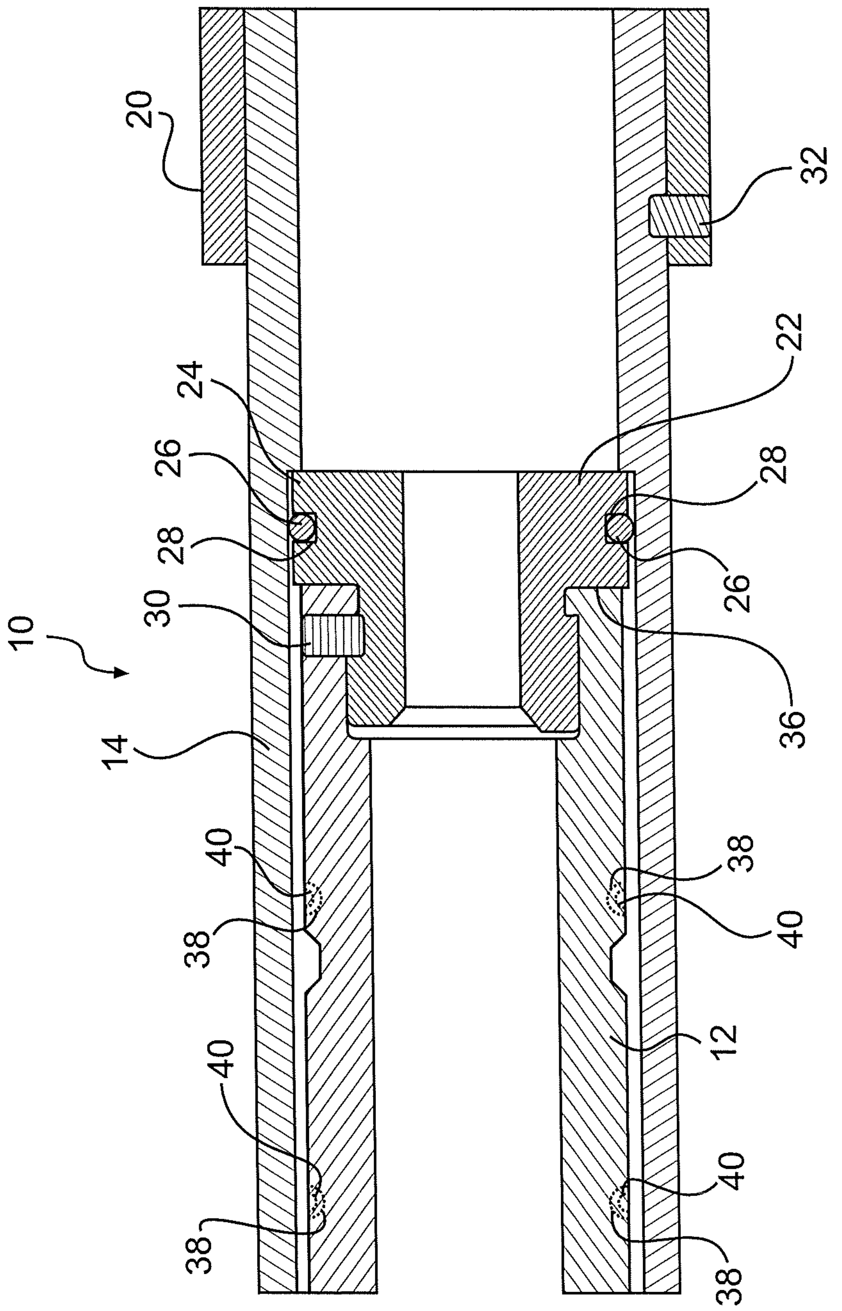
FIG. 2 is a cross-sectional view of a portion of a hold open rod in accordance with an embodiment of the invention.
Figure 3:
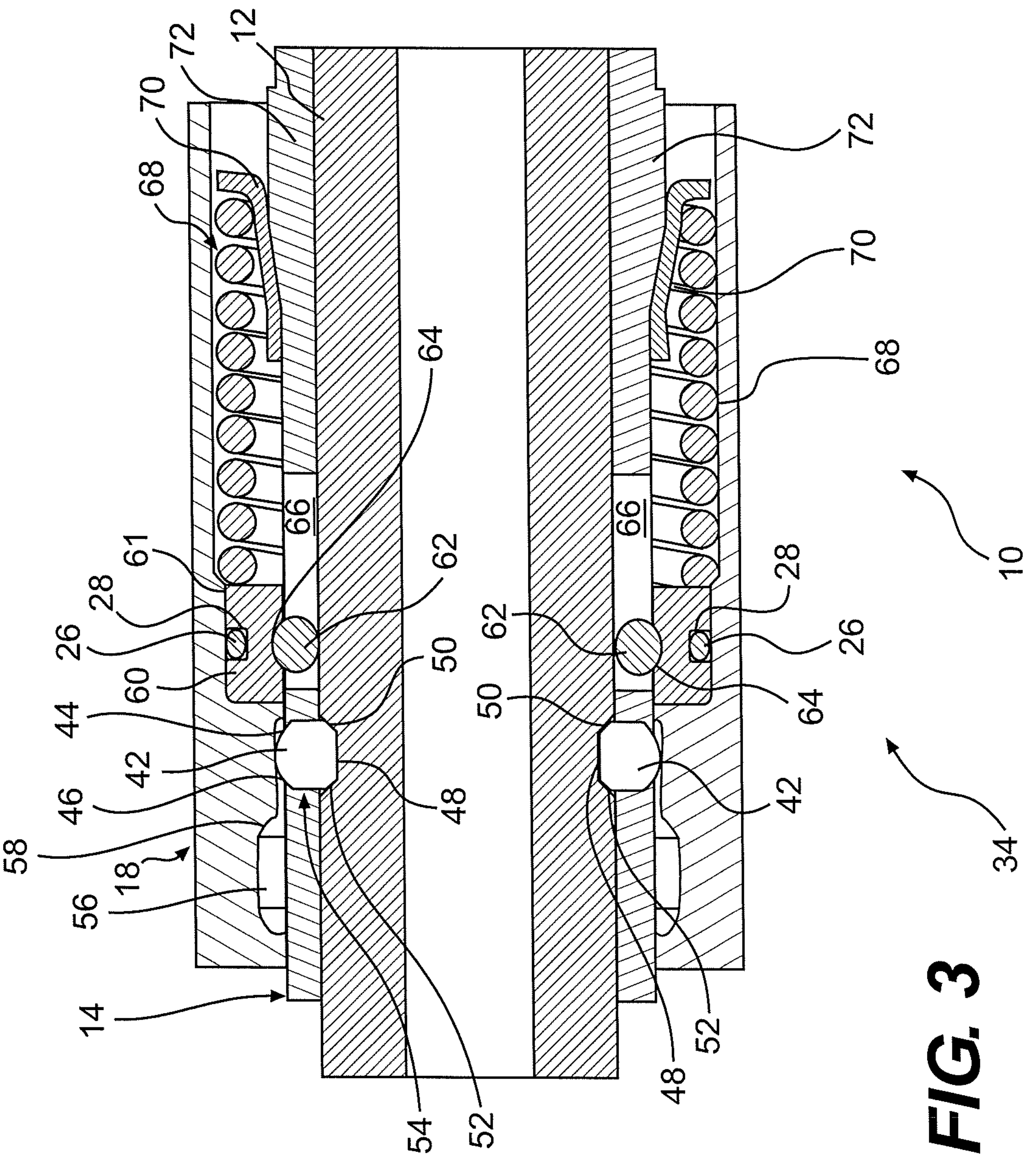
FIG. 3 is a cross-sectional view of a portion of the hold open rod in accordance with an embodiment of the invention.

FIGS. 2 and 3 illustrate an improved hold open rod 10 that may reduce wear, fretting and generation of noise. FIG. 2 illustrates a cross-sectional partial view of a hold open rod 10 in accordance with an embodiment of the invention. The hold open rod 10 includes an end cap 20 placed at the end of an outer tube 14. The end cap 20 may be secured to the outer tube 14 by a dowel or pin 32, as shown. The dowel or pin 32 may extend from the end cap 20 into the outer tube 14 to secure the end cap 20 to the outer tube 14.

The inner tube 12 slides within the outer tube 14. The inner tube 12 may be equipped with a stop 22. The stop 22 helps prevent the hold open rod 10 from extending to the point that the inner tube 12 comes out of the outer tube 14. The stop 22 may be attached to the inner tube 12 in any of a variety of ways. For example, as shown, a dowel or pin 30 may be used to connect the stop 22 to the inner tube 12. In other embodiments of the invention, the stop 22 may be press fit, threadably fastened to the inner tube 12, attached by an adhesive, other mechanical fasteners or any other suitable method. The stop 22 may include a flange 24. The flange 24 may be of a slightly larger diameter than the inner tube 12 and may assist in preventing the hold open rod 10 from overextending by interference with a structured feature at the end of the outer tube 14 when the inner tube 12 is extended from the outer tube 14.

The flange 22 may include an O-ring groove 28 which seats an O-ring 26. The O-ring 26 may be made of a resilient material such as, for example, rubber or another resilient material. The O-ring 26 provides a connection between the stop 22 and an inner diameter of the outer tube 14. The O-ring 26 may help center the inner tube 12 within the outer tube 14. The O-ring's resilience can help reduce a tendency to create noise, fretting or wear between the stop 22 or inner tube 12 and the outer tube 14.

While the stop 22 is located at the end 36 of the inner tube 12, it may be desired to have one or more additional O-rings 40 (shown in phantom lines) situated along the length of the inner tube 12. Such, additional O-ring grooves 38, may be optionally present in the inner tube 12. In concert with this, one or more fitted in optional O-rings 40 may be placed within the optional O-ring grooves 38. The O-rings 26 and 40 may be selected so that the diameter of the O-rings 26 and 40 as installed is small enough to permit the inner tube 12 to slide within the outer tube 14, but large enough that the actual structure of the inner tube 12 cannot contact the outer tube 14.

FIG. 3 illustrates a lock mechanism 34 which locks the inner tube 12 with the outer tube 14. While the lock mechanism 34 is described in some detail it will be understood by one of ordinary skill in the art that various embodiments of the invention can use various lock mechanisms 34. The lock mechanism 34 shown is meant to be an exemplary lock mechanism and does not limit the invention in anyway. Furthermore, it should be noted that in some embodiments the lock mechanism 34 is not an essential part of the invention but is merely an incidental feature of hold open rod 10.

As shown in FIG. 3, the hold open rod 10 includes an outer tube 14. The outer tube 14 may be swaged. Other embodiments may include a lock body which is threaded into the outer tube 14 for performing the locking function. On the outer diameter of the swaged portion of the outer tube 14 on the locking mechanism 34, there is a spring loaded collar 18. The collar 18 houses locking dogs 42 and retains the locking dogs 42 radially against the outside diameter of the inner tube 12 while the rod 10 is in the retracted or stowed position.

The locking dog 42 includes chamfered edges 44 and 46. The locking slot 48 also includes chamfered edges 50 and 52. The chamfered edges 44, 46, 50 and 52 aid in assisting the locking dog 42 moving in and out of the locking slot 48.

As shown in FIG. 3, the release collar 18 is in a position that prevents the locking dog 42 from exiting the locking slot 48. Thus, the inner tube 12 and outer tube 14 are locked together. However, if the release collar is moved toward the right with respect to the orientation shown in FIG. 3, the opening 56 in the release collar 18 will be exposed to the locking dog 42 allowing the locking dog 42 to move out radially and into the opening 56. Such a move by the locking dog 42 will unlock the inner tube 12 from the outer tube 14. Some embodiments may require the release collar 18 to be twisted to unlock the hold open rod 10.

Movement of the release collar 18 to the right will cause the isolator 60 contacting the collar 18 along a surface 61 to move on the roller or ball bearing 62 located in the ball bearing slot 64 in the isolator 60. The isolator 60 and ball bearing 62 may move within the ball bearing slot 66 in the outer tube 14 against the urging of the spring 68. The spring 68 is between the isolator 60 and the spring stop 70 and exerts as a force on both. The spring stop 70 is placed against the thicker part 72 of the outer tube 14. The user may overcome the force of the spring 68 by manually moving the release collar 18 towards the right, thereby unlocking the hold open rod 10 by exposing the opening 56 in the release collar 18 to the locking dogs 42. Exposing the opening 56 allows the locking dogs 42 to move radially within an opening 54 in the outer tube 14 and out of the locking slot 48 and into the opening 56. Furthermore, movement of the release collar 18 back toward the left causes the locking dog 42 to slide its chamfered edge 44 along the chamfered side 58 of the opening 56 causing the locking dog 42 to move back into the locking slot 48.

The isolator 60 may include an O-ring groove 28 which contains an O-ring 26. The O-ring 26 in the O-ring groove 28 may be resilient and perform similar function as the O-ring 26 as shown and described with respect to FIG. 2. The O-ring 26 helps to center the isolator 60 and the outer tube 14 within the collar 18. The O-ring 26 may also help avoid the outer tube 14 from making noise with, fretting, wearing or otherwise rubbing against the release collar 18.

The isolator 60 may be made with plastic material and may include the ball bearing slot 64 for the ball bearing 62. The number of ball bearings 62 used may vary depending on the size and the geometry of the hold open rods 10. The O-ring 28 presses against the inner diameter of the collar 18 and the outer O-ring diameter of 28 of the isolator 60. The ball bearing slot 64 of the isolator 60 then rests on the ball bearings 62 which are located on the outer diameter of the inner tube 12.

The ball bearings 62 allow the isolator 60 to move with reduced friction with the release collar 18 as the release collar 18 is pulled and/or turned to release the locking mechanism 34. The isolator 60 and O-ring 26 provide dampening in order to reduce or eliminate contact between the release collar 18 and the outer tube 14 during vibration, thereby preserving any corrosion resistant coatings, other finishes, reducing noise, fretting and/or wear.

In other embodiments of the invention, other locking mechanisms may be used, however in many of these embodiments resilient materials such as O-rings 26 may be used to prevent or reduce making noise, fretting, wear, or the removal of coatings or finish between parts due to rubbing of parts together during vibration.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hold open rod comprising:

an outer tube;

an inner tube having two ends, at least one end configured to slide within the outer tube;

a tube stop located at one end of the inner tube;

a groove around the circumference of the tube stop;

a resilient material located in the groove, the resilient material contacting the tube stop and the outer tube;

multiple deposits of resilient material placed between the inner and outer tubes around the circumference of the inner tube along the length of the tube; and grooves in at least one of either the outer circumference of the inner tube and the inner circumference of the outer tube wherein the multiple deposits of resilient material are in the grooves.

2. The rod of claim 1, wherein the resilient material is an O-ring.

3. The rod of claim 1, wherein the resilient material is an O-ring.

4. The rod of claim 1, wherein substantially the only contact between the inner tube and the outer tube is via the resilient material.

5. The rod of claim 1, wherein the resilient material and outer tube communicate to center the inner tube with respect to the outer tube.

6. A hold open rod comprising:

an outer tube;

an inner tube having two ends, at least one end configured to slide within the outer tube;

a tube stop located at one end of the inner tube;

a groove around the circumference of the tube stop;

a resilient material located in the groove, the resilient material contacting the tube stop and the outer tube;

a release collar configured to be actuated to selectively release and lock the inner tube with the outer tube;

an isolator contained by the release collar surrounding the outer tube; and a resilient material surrounding and contacting the isolator and the release collar; and a spring and the spring biases the release collar to a locking position and the spring urges against the isolator.

7. The rod of claim 6, further comprising a groove in at least one of the isolator and the inner diameter of the release collar and the resilient material is located in the groove.

8. The rod of claim 7, wherein the resilient material is an O-ring.

9. The rod of claim 8, further comprising a ball bearing and the isolator contacts the O-ring on one side and the ball bearing on a side opposite the side contacting the O-ring.

10. The rod of claim 9, wherein the ball bearing is located between the collar and the inner tube.

11. A method of reducing wear on a hold open rod comprising:

locating first resilient material between an inner tube and an outer tube;

configuring the inner tube to slide within the outer tube;

providing a locking mechanism to lock the inner tube with respect to the outer tube;

providing a second resilient material between an isolator and a collar on the locking mechanism; and configuring a ball bearing to dwell between the isolator and the inner tube and reduce friction between the collar and the inner tube when the collar and the inner tube move with respect to each other.

12. The method of claim 11, further comprising locating the first resilient material in a groove on a slide stop and the second resilient material in a groove in an isolator.

13. The method of claim 11, further comprising locating resilient material between the first and second resilient material and between the inner and outer tubes.

14. The method of claim 11 wherein the first and second resilient material comprises an O-ring.

* * * * *